United States Patent
Eom et al.

(10) Patent No.: US 12,265,970 B2
(45) Date of Patent: Apr. 1, 2025

(54) MOBILE TERMINAL AND PRODUCT REGISTRATION METHOD THEREOF

(71) Applicant: LG Electronics Inc., Seoul (KR)

(72) Inventors: Jiwoong Eom, Seoul (KR); Sujung Kim, Seoul (KR); Eunhyun Lee, Seoul (KR); Changju Na, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/789,743

(22) PCT Filed: Jul. 19, 2021

(86) PCT No.: PCT/KR2021/009233
§ 371 (c)(1),
(2) Date: Jun. 28, 2022

(87) PCT Pub. No.: WO2023/286894
PCT Pub. Date: Jan. 19, 2023

(65) Prior Publication Data
US 2024/0193614 A1   Jun. 13, 2024

(30) Foreign Application Priority Data
Jul. 16, 2021 (KR) .................. 10-2021-0093613

(51) Int. Cl.
*H04L 12/28* (2006.01)
*G06Q 10/0833* (2023.01)
(Continued)

(52) U.S. Cl.
CPC ....... *G06Q 30/012* (2013.01); *G06Q 10/0833* (2013.01); *H04L 9/0866* (2013.01);
(Continued)

(58) Field of Classification Search
CPC .. G06Q 30/012; G06Q 10/0833; H04L 67/55; H04L 9/0866; H04L 12/2809; H04L 67/12
See application file for complete search history.

(56) References Cited

U.S. PATENT DOCUMENTS

2017/0288965 A1    10/2017  Cebere
2020/0153650 A1 *   5/2020  Yang ................... H04L 12/12
(Continued)

FOREIGN PATENT DOCUMENTS

EP    3787235 A1      3/2021
EP    4145774 A1 *    3/2023    ......... G06Q 10/0833
(Continued)

OTHER PUBLICATIONS

Extended European Search Report in European Appln. No. 21935431.3, mailed on Jun. 13, 2024, 7 pages.

*Primary Examiner* — Suraj M Joshi
(74) *Attorney, Agent, or Firm* — Fish & Richardson P.C.

(57) ABSTRACT

A mobile terminal includes: a display, a wireless communication interface configured to perform wireless communication with a home appliance or an external server, and a controller. The controller is configured to control the display to display an automatic registration guide screen displaying one or more home appliances according to execution of a home appliance management application, receive an automatic registration request for automatic registration of a first home appliance among the one or more home appliances, and control the display to display an automatic registration process screen indicating automatic registration progress of the first home appliance in response to the received automatic registration request.

18 Claims, 14 Drawing Sheets

(51) Int. Cl.
*G06Q 30/012* (2023.01)
*H04L 9/08* (2006.01)
*H04L 67/12* (2022.01)
*H04L 67/55* (2022.01)

(52) U.S. Cl.
CPC .......... *H04L 12/2809* (2013.01); *H04L 67/12* (2013.01); *H04L 67/55* (2022.05)

(56) References Cited

U.S. PATENT DOCUMENTS

2021/0068068 A1* 3/2021 Lee ................ H04W 12/08
2023/0084984 A1   3/2023 Lee

FOREIGN PATENT DOCUMENTS

| KR | 101631435 | 6/2016 |
| KR | 101980039 | 5/2019 |
| KR | 10-2020-0123498 A | 10/2020 |
| KR | 102214940 | 2/2021 |
| KR | 20210026834 | 3/2021 |

* cited by examiner

MOBILE TERMINAL AND PRODUCT REGISTRATION METHOD THEREOF

CROSS-REFERENCE TO RELATED APPLICATIONS

This application is a National Stage application under 35 U.S.C. § 371 of International Application No. PCT/KR2021/009233, filed on Jul. 19, 2021, which claims the benefit of Korean Patent Application No. 10-2021-0093613, filed on Jul. 16, 2021. The disclosures of the prior applications are incorporated by reference in their entirety.

TECHNICAL FIELD

The present disclosure relates to automatic registration of home appliances to a server.

BACKGROUND

When a home appliance is delivered to a customer, a product registration process is required to confirm that the home appliance is received by the customer.

A conventional product registration procedure has been performed by pressing a physical key (or a confirm key) provided in a home appliance.

However, in the conventional product registration method, the input method of the physical key is different for each home appliance, and the contents of the guide for the registration procedure are different from each other for different home appliances. Thus, the customer needs to learn different product registration methods for different appliances.

In addition, the physical key has to be input within a limited time. In some examples, the customer may experience difficulties understanding the guide and inputting the physical key into the home appliance for a limited time (for example, three minutes). Thus, customers may often fail to register their home appliances.

In particular, when the cause of product registration failure is analyzed, the number of cases where the physical key input fails and the home appliance is registered by other methods is greater than the number of cases where the home appliance is registered using the physical key input.

SUMMARY

The present disclosure is directed to automatically registering a home appliance to a server without requesting a customer to input a physical key.

The present disclosure is also directed to automatically searching for a home appliance delivered to a customer and automatically registering the home appliance to a server.

According to one aspect of the subject matter described in this application, a terminal can include a display a wireless communication interface configured to perform wireless communication with a home appliance or an external server, and a controller. The controller can be configured to control the display to display an automatic registration guide screen displaying one or more home appliances according to execution of a home appliance management application, receive an automatic registration request for automatic registration of a first home appliance among the one or more home appliances, and control the display to display an automatic registration process screen indicating automatic registration progress of the first home appliance in response to the received automatic registration request.

Implementations according to this aspect can include one or more of the following features. For example, the controller can be configured to receive, from a first server, an auto registration key corresponding to a media access control (MAC) address of the first home appliance according to the reception of the automatic registration request, and transmit the received auto registration key to a second server and the first home appliance.

In some examples, the controller can be configured to control the display to display a notification received from the second server and indicating that the automatic registration of the home appliance has been completed. In some examples, the controller can be configured to, based on the automatic registration of the first home appliance being failed, control the display to display a notification received from the second server and requesting registration of the first home appliance through a physical key of the first home appliance.

In some examples, the controller can be configured to, based on a predefined time being elapsed, invalidate the auto registration key. In some implementations, the controller can be configured to perform the automatic registration of the first home appliance in a background of the mobile terminal such that performing the automatic registration does not cause the display to display an object related to the automatic registration.

In some examples, the controller can be configured to receive, from the first server, a push notification indicating that delivery of the first home appliance has been completed, and execute the home appliance management application according to the received push notification. In some examples, the push notification can correspond to a user number that is confirmed by the first server based on user information included in delivery completion information.

In some implementations, the notification indicating that the automatic registration of the first home appliance has been completed can be provided by the second server after determining that an auto registration key received from the first home appliance corresponds to the auto registration key from the mobile terminal. In some implementations, the notification requesting registration of the first home appliance through the physical key can be provided by the second server after determining that an auto registration key received from the first home appliance does not correspond to the auto registration key from the mobile terminal.

According to another aspect of the subject matter described in this application, an automatic registration method of a mobile terminal can include displaying an automatic registration guide screen displaying one or more home appliances according to execution of a home appliance management application, receiving an automatic registration request for automatic registration of a first home appliance among the one or more home appliances, and displaying, in response to the received automatic registration request, an automatic registration process screen indicating automatic registration progress of the first home appliance.

Implementations according to this aspect can include one or more of the following features. For example, the automatic registration method can further include receiving, from a first server, an auto registration key corresponding to a media access control (MAC) address of the first home appliance in response to reception of the automatic registration request, and transmitting the received auto registration key to a second server and the first home appliance.

In some implementations, the automatic registration can method further include displaying a notification received from the second server and indicating that the automatic registration of the first home appliance been completed. In some implementations, the automatic registration method can further include displaying, based on the automatic registration of the first home appliance being failed, a notification received from the second server and requesting registration of the first home appliance through a physical key of the first home appliance.

In some examples, the auto registration key can be invalidated based on a predefined time being elapsed. In some implementations, the automatic registration of the first home appliance can be performed in a background of the mobile terminal such that performing the automatic registration does not display an object related to the automatic registration.

In some examples, the automatic registration method can further include receiving, from the first server, a push notification indicating that delivery of the first home appliance has been completed, and executing the home appliance management application according to the received push notification. In some examples, the push notification can correspond to a user number that is confirmed by the first server based on user information included in delivery completion information.

In some implementations, the notification indicating that the automatic registration of the first home appliance has been completed can be provided by the second server after determining that an auto registration key received from the first home appliance corresponds to the auto registration key from the mobile terminal. In some implementations, the notification requesting registration of the first home appliance through the physical key can be provided by the second server after determining that an auto registration key received from the first home appliance does not correspond to the auto registration key from the mobile terminal.

In some implementations, since it is unnecessary to provide a user with a different physical key usage method and a different guide document for each home appliance, a user does not need learn another product registration process.

In addition, since it is unnecessary to force input of a physical key within a limited time (for example, three minutes) during product registration, convenience is provided to a user.

In addition, since product registration is automatically performed in the background, it is possible to provide a convenience in which there is no user interface (UI) scene presented to a user.

Moreover, a UX of a new experience that enables other Internet services to be used without interruption during product registration may be provided to a user.

DETAILED DESCRIPTION

Figure 1:
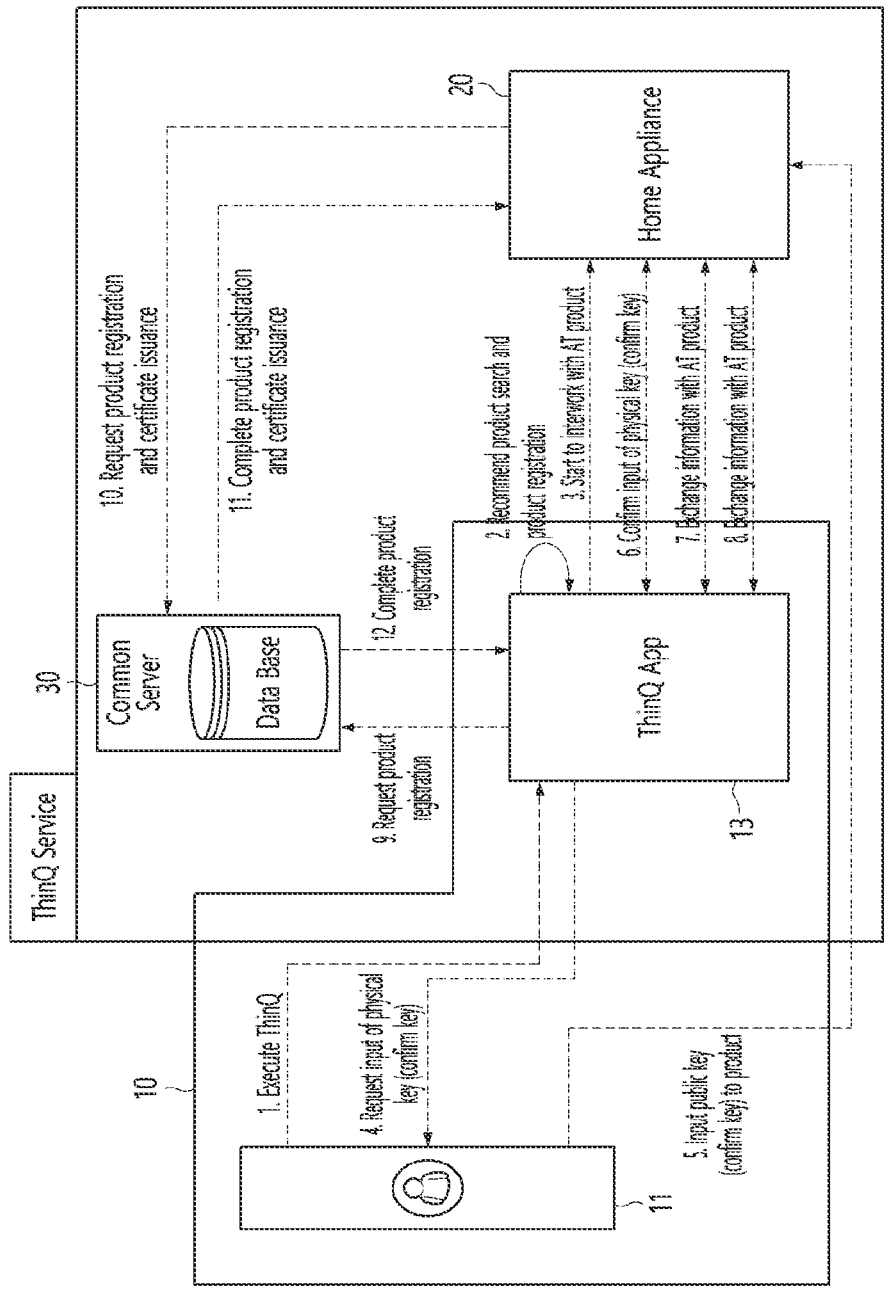
FIGS. 1, 2, and 3 are diagrams illustrating a conventional process of registering a home appliance to a server.
Figure 2:
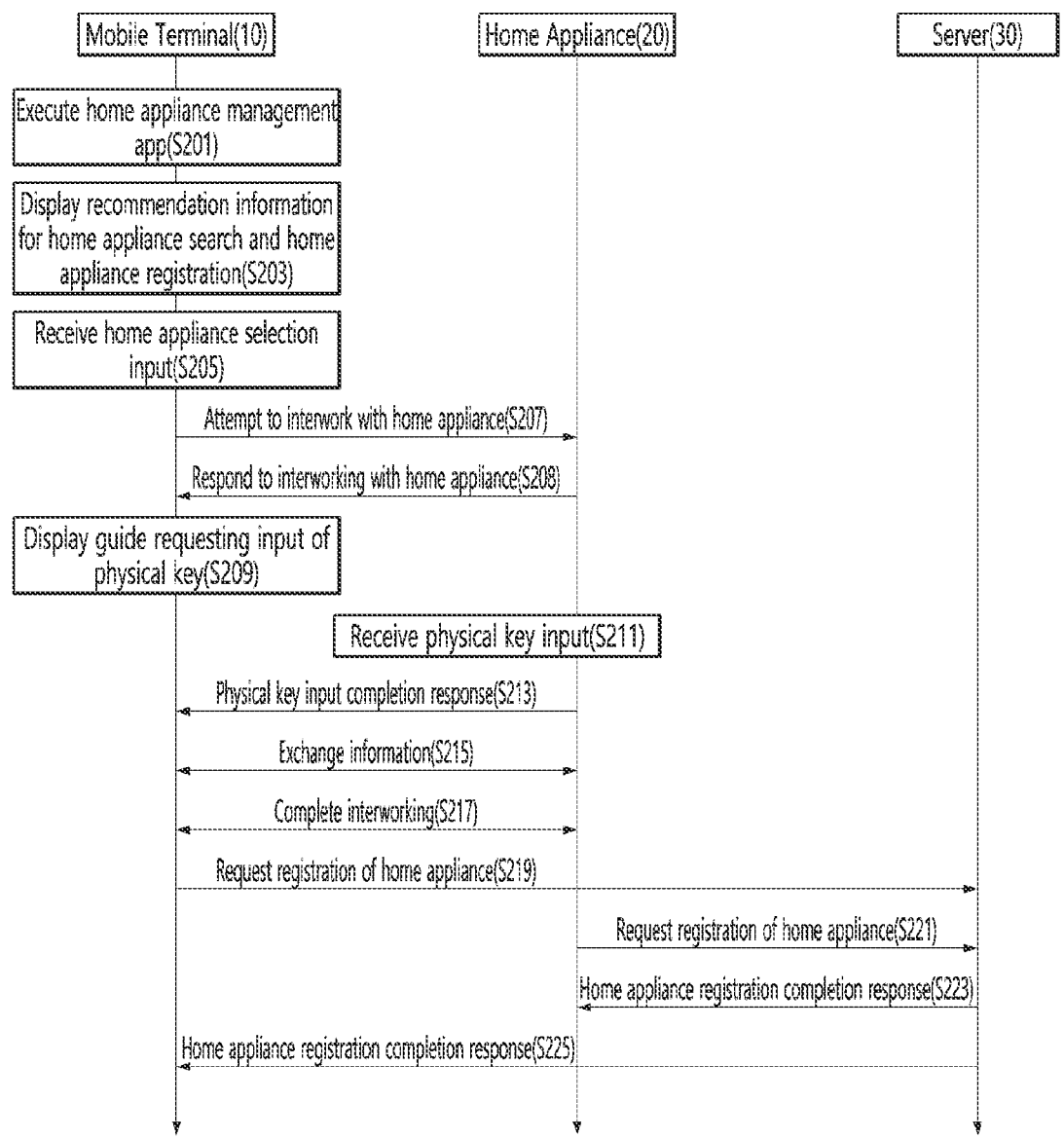
Figure 3:
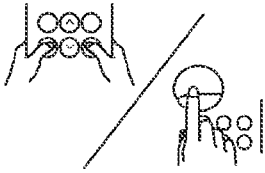

FIGS. 1, 2, and 3 are diagrams illustrating an example of a conventional process of registering a home appliance to a server.

Registering the home appliance to the server may be an operation of authenticating that an owner of the home appliance is a user.

Referring to FIGS. 1 and 2, a home appliance management system includes a mobile terminal 10, a home appliance 20, and a server 30.

The mobile terminal 10 may include a smartphone and a smart pad.

The home appliance 20 can be an electronic device provided in a house, such as a washing machine, a refrigerator, an air purifier, and an air conditioner.

Hereinafter, a conventional process of registering a home appliance will be described with reference to FIGS. 1 and 2.

The mobile terminal 10 can execute a home appliance management app (application) (S201). The home appliance management app can be an application for registration and operation control of the home appliance, and can be installed in the mobile terminal 10.

The home appliance management app can be called a ThinQ app, as illustrated in FIG. 1.

The mobile terminal 10 can display recommendation information for home appliance search and home appliance registration (S203). The recommendation information can include a search result of one or more home appliances provided in the house.

The mobile terminal 10 can receive an input for selecting a specific home appliance among the one or more home appliances (S205).

The mobile terminal 10 can attempt to interwork or connect with the selected home appliance 20 for wireless connection (S207). The mobile terminal 10 can attempt to interwork with the home appliance 20 by using a Software enabled Access Point (SoftAP). The SoftAP can refer to implementation of a function of a wireless access point in software to operate like a wireless AP.

The mobile terminal 10 can attempt to interwork with the home appliance 20 by driving the SoftAP using a wireless LAN module.

The mobile terminal 10 can receive an interworking response from the home appliance 20 (S208), and display a guide requesting input of a physical key (or a confirm key) according to the received interworking response (S209).

The input of the physical key can be an input for registering the home appliance 20 to the home appliance management app for managing the home appliance.

FIG. 3 illustrates an example of a physical key input request guide for each of a plurality of home appliances.

Each guide may include text to press a specific physical key provided in the home appliance for 3 seconds or longer.

The shape of each guide illustrated in FIG. 3 may vary depending on the home appliance selected in operation S205.

For example, a first guide 310 can be a physical key input request guide for product registration of an air conditioner, a second guide 330 can be a physical key input request guide for product registration of an air purifier, and a third guide 350 can be a physical key input request guide for product registration of a dehumidifier.

The shape of each guide may be different because the shape of the physical key provided in each home appliance may be different.

The home appliance 20 can receive a physical key input through a user input (S211), and transmit, to the mobile terminal 10, a physical key input completion response indicating that the physical key input is completed (S213).

Thereafter, the mobile terminal 10 and the home appliance 20 can exchange information (S215) and complete the interworking or connection with each other (S217).

The mobile terminal 10 and the home appliance 20 can exchange their model names and product identification numbers with each other.

The physical key input may be satisfied when the physical key provided in the home appliance 20 is selected for three seconds or longer.

Thereafter, the mobile terminal 10 can transmit, to the server 30, a registration request requesting the registration of the home appliance 20 to the server 30 (S219). In some examples, the home appliance 20 can transmit, to the server 30, a registration request requesting the registration of the home appliance 20 to the server 30 (S221).

In particular, the home appliance 20 may additionally transmit a certificate issuance request to the server 30 in addition to the product registration request as illustrated in FIG. 1.

The server 30 can transmit a registration completion response indicating completion of product registration to the home appliance 20 (S223). In some examples, the server 30 can transmit, to the home appliance 20, a certificate issuance completion response indicating certificate issuance in addition to the registration completion response as illustrated in FIG. 1.

When the registration of the home appliance 20 and the issuance of the certificate are completed, the server 30 can transmit, to the mobile terminal 10, a completion response indicating that the registration of the home appliance is completed (S225).

As illustrated in FIG. 3, in the conventional process, the method of inputting the physical key is different for each product, and thus, the contents of the guide may vary.

In addition, the physical key has to be input within a limited time, such that if the customer experience difficulties understanding the guide and inputting the physical key into the product for a limited time, e.g., three minutes, customers may fail to register their products.

In particular, when the cause of product registration failure is analyzed, the number of cases where the physical key input fails and the product is registered by other methods is greater than the number of cases where the home appliance is registered using the physical key input.

Hereinafter, a method of automatically searching for a home appliance delivered to a customer and automatically registering the home appliance in a server will be described.

Figure 4A:
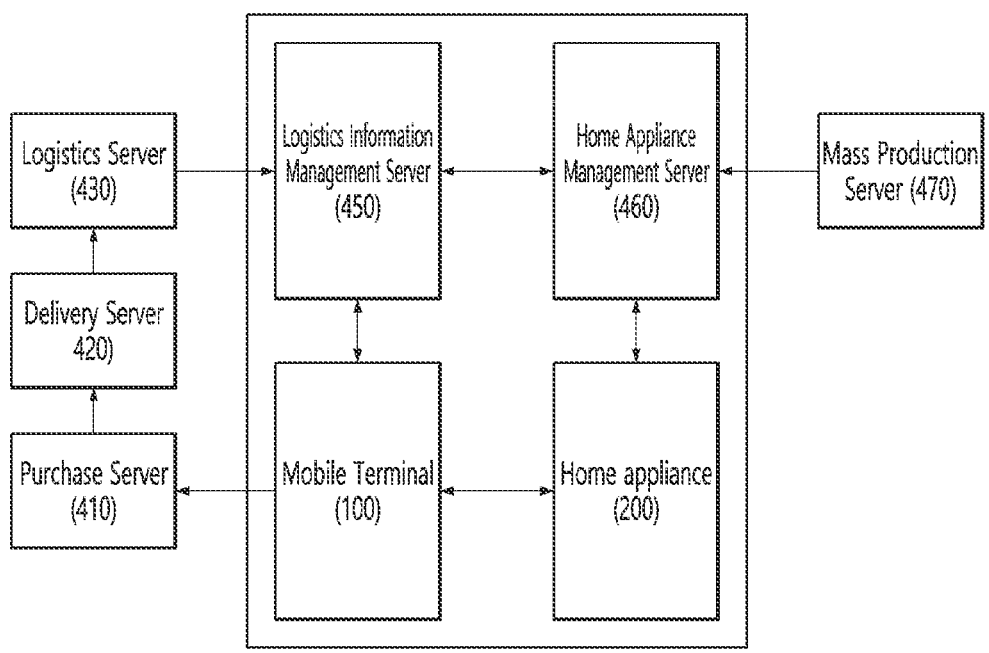
FIG. 4A is a diagram illustrating an example of a product registration system.

FIG. 4A is a diagram illustrating an example of a product registration system.

Referring to FIG. 4A, in some implementations, a product registration system 4 can include a purchase server 410, a delivery server 420, a logistics server 430, a mobile terminal 100, a home appliance 200, a logistics information management server 450, a home appliance management server 460, and a mass production server 470.

In some implementations, the product registration system 4 can include only the mobile terminal 100, the home appliance 200, the logistics information management server 450, and the home appliance management server 460.

When a user purchases the home appliance 200, purchase information of the home appliance 200 can be transmitted to the purchase server 410, and the purchase server 410 can transmit the purchase information to the delivery server 420.

The purchase information can include user information and a model name of the home appliance 200, and the user information of the home appliance 200 can include a user ID for accessing a home appliance management app.

The delivery server 420 can transmit the purchase information and the product information of the home appliance 200 to the logistics server 430. The product information can include a serial number or a logistics barcode of the home appliance 200.

The delivery server 420 can be a server for production standard information standardization and integrated production information management, and can be divided into a Global View that manages major production and quality indicators and a Local View that supports on-site production execution.

The logistics server 430 can transmit, to the logistics information management server 450, the purchase information and the product information received from the delivery server 420.

The logistics server 430 can transmit a delivery-related notification to a customer who purchases products that pass through a manufacturer's logistics center.

The mass production server 470 can transmit a media access control (MAC) address and a serial number of the mass-produced home appliance to the home appliance management server 460.

The MAC address of the home appliance can be an address that uniquely identifies the home appliance.

The serial number of the home appliance can include a character code used to authenticate that the product is genuine.

The home appliance management server 460 can store, in a database, the MAC address and the serial number of the home appliance received from the mass production server 470.

For example, the home appliance management server 460 can map and store MAC addresses and serial numbers corresponding to a plurality of home appliances.

In addition, as depicted in FIG. 4A, the logistics information management server 450 and the home appliance management server 460 may be described as separate components, but, in some implementations, the logistics information management server 450 and the home appliance management server 460 may be configured as one server.

Figure 4B:
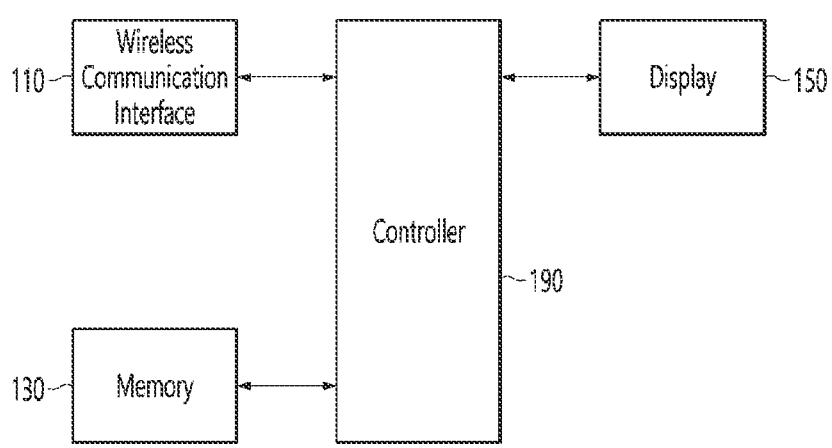
FIG. 4B is a diagram illustrating an example of a mobile terminal.

FIG. 4B is a diagram illustrating an example of the mobile terminal.

The mobile terminal 100 can include a wireless communication interface 110, a memory 130, a display 150, and a controller 190.

The wireless communication interface 110 can transmit and receive data to and from external devices, such as the home appliance 200, the logistics information management server 450, and the home appliance management server 460, by using wireless communication technology.

For example, the wireless communication interface 110 can transmit and receive sensor information, a user input, and a control signal to and from the external devices.

The communication technology used by the wireless communication interface 110 can include Global System for Mobile communication (GSM), Code Division Multi Access (CDMA), Long Term Evolution (LTE), 5G, Wireless LAN (WLAN), and Wireless-Fidelity (Wi-Fi).

The memory 130 can store data supporting various functions. For example, the memory 130 can store software for driving an application.

The display 150 can display (output) information processed by the mobile terminal 100.

The display 150 can display execution screen information of an application program driven in the mobile terminal 100 or user interface (UI) and graphic user interface (GUI) information according to the execution screen information.

The display 150 can implement a touch screen by providing a mutual layer structure with the touch sensor or being integrally provided with the touch sensor.

The touch screen can provide an input interface between the mobile terminal 100 and the user.

The controller 190 can control overall operations of the mobile terminal 100.

Figure 4C:
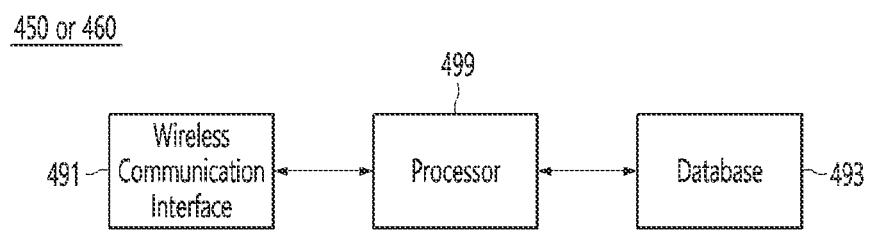
FIG. 4C is a diagram illustrating an example of a server.

FIG. 4C is a diagram illustrating an example of the server.

The components of the server illustrated in FIG. 4C can be components of the logistics information management server 450 or the home appliance management server 460 illustrated in FIG. 4A.

The server can include a wireless communication interface 491, a database 493, and a processor 499.

The wireless communication interface 491 can perform wireless communication with the mobile terminal 100, the home appliance 200, or the external server.

The communication technology used by the wireless communication interface 491 can include global system for mobile communication (GSM), code-division multiple access (CDMA), long-term evolution (LTE), 5th generation mobile network (5G), wireless location area network (WLAN), and Wi-Fi.

The database 493 of the logistics information management server 450 can store delivery completion information of the product received from the logistics server 430. The delivery completion information can include user information, a logistics barcode, and a serial number.

The processor 499 can control overall operations of the server.

The processor 499 of the logistics information management server 450 can generate an auto registration key for automatic registration of the home appliance 200.

The processor 499 of the home appliance management server 460 can determine whether to register the home appliance 200 based on the certificate issuance request received from the home appliance 200.

The database 493 of the home appliance management server 460 can store a plurality of MAC addresses received from the mass production server 470 and a plurality of serial numbers corresponding to the plurality of MAC addresses.

Figure 5:
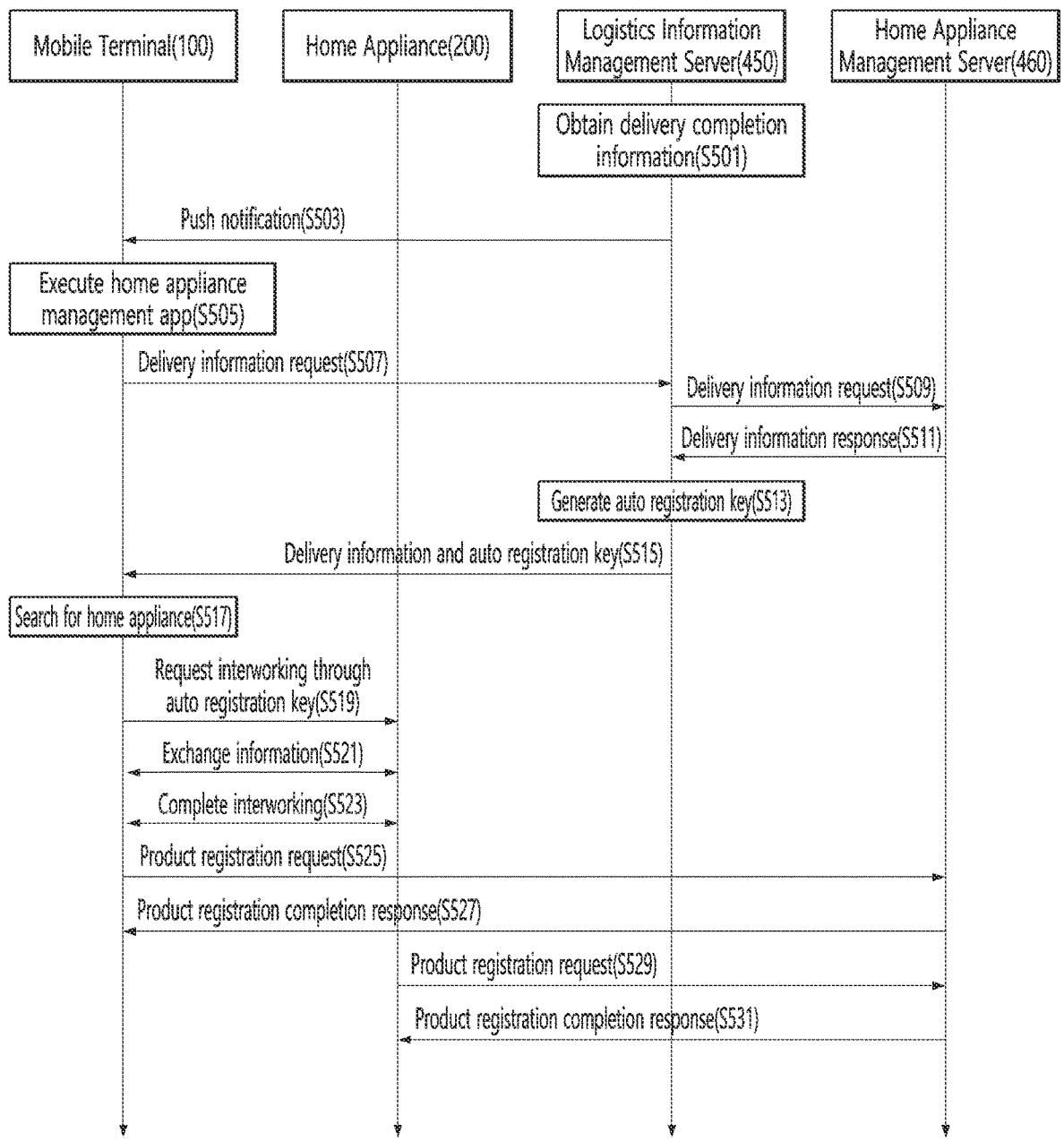
FIG. 5 is a diagram illustrating an example of an operating method of a product registration system.

FIG. 5 is a diagram illustrating an example of an operating method of the product registration system.

Hereinafter, the registration process of the home appliance may refer to a process of confirming whether the home appliance delivered to the customer is the appliance purchased by the customer.

Referring to FIG. 5, the logistics information management server 450 can obtain delivery completion information indicating that delivery of the home appliance 200 is completed (S501).

In some implementations, the delivery completion information can include one or more of a serial number and a logistics barcode of the delivered home appliance 200 and user information about the user who is the owner of the delivered home appliance 200.

The user information can include a user ID of the home appliance management app or information identifying a user related to the user ID.

The serial number of the home appliance 200 can be a character code used to authenticate that the home appliance 200 is a genuine product purchased at a head office, an authorized retailer, or an agency.

The logistics barcode can include a code for identifying a country, a manufacturer, a product type, and the like. The logistics barcode can be configured in the form of a QR code.

The logistics information management server 450 can receive delivery completion information from a terminal of a delivery driver who delivers the home appliance 200.

Figure 6:
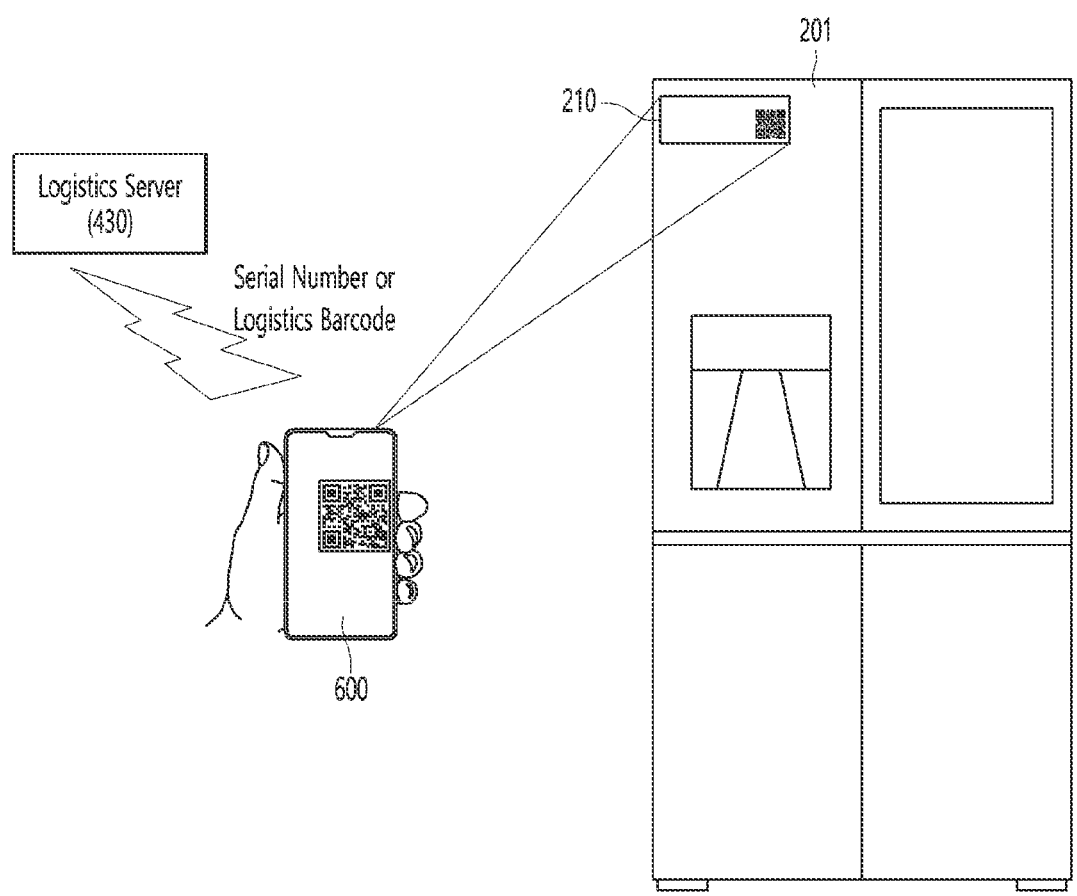
FIG. 6 is a diagram illustrating an example of transmitting delivery completion information to a logistics server.

FIG. 6 is a diagram illustrating an example of transmitting delivery completion information to the logistics server 430.

Referring to FIG. 6, the home appliance can be a refrigerator 201, and a product information item including product information is attached to the front surface of the refrigerator 201.

A delivery driver can read a serial number or a logistic barcode included in the product information item 210 through his/her terminal 600.

For example, the product information item can include a serial number or a logistics barcode (or a QR code).

The terminal 600 of the delivery driver can transmit a scanned serial number or logistics barcode to the logistics server 430.

The logistics server 430 can transmit, to the logistics information management server 450, delivery completion information including the serial number or the logistics barcode.

In some implementations, the terminal 600 of the delivery driver can transmit the scanned serial number or logistics barcode directly to the logistics information management server 450.

Referring to FIG. 5, the logistics information management server 450 can transmit a push notification to the mobile terminal 100 of the user based on the delivery completion information (S503).

The logistics information management server 450 can transmit a push notification to the mobile terminal 100 of the corresponding user through the home appliance management app, based on the user information included in the delivery completion information.

In some implementations, the push notification can include a notification indicating that the delivery of the home appliance 200 is completed.

In some implementations, the push notification can include a notification requesting the registration of the delivered home appliance 200 as the delivery of the home appliance 200 is completed.

The mobile terminal 100 can execute the home appliance management app based on the received push notification (S505).

The mobile terminal 100 can transmit, to the logistics information management server 450, a delivery information request requesting delivery information according to the execution of the home appliance management app (S507).

The delivery information request can include a request for searching which home appliance has been delivered to the user's home.

For example, the delivery information request can include a request for a MAC address of the home appliance 200 for which the delivery has been completed corresponding to the user ID.

By way of further example, the delivery information can include the MAC address of the home appliance 200 that has been delivered to the user corresponding to the user ID.

The logistics information management server 450 can transmit, to the home appliance management server 460, the delivery information request received from the mobile terminal 100 (S509).

In some implementations, the logistics information management server 450 can obtain a serial number or a logistics barcode corresponding to the user ID included in the delivery information request.

In some implementations, the logistics information management server 450 can obtain a serial number or a logistics barcode corresponding to the user ID based on the delivery completion information obtained in operation S501.

The logistics information management server 450 can receive, from the home appliance management server 460, a delivery information response including delivery information in response to the delivery information request (S511).

The home appliance management server 460 can obtain the MAC address of the home appliance 200 mapped to the serial number or the logistics barcode, and can transmit, to the logistics information management server 450, a delivery information response including the obtained MAC address.

The logistics information management server 450 can generate an auto registration key for automatic registration of the home appliance 200 based on the delivery information response (S513).

The auto registration key can include a key that is valid only for a certain time. For example, the auto registration key may be a key valid only for a certain time, such as one-time password (OTP).

The certain time may be one hour, but this is only an example. The auto registration key cannot be used as a valid key after a certain time has elapsed.

In some implementations, the logistics information management server 450 can invalidate the auto registration key when the authentication process of the auto registration key is not performed within one hour after the auto registration key is generated. The invalidated auto registration key cannot be used for automatic registration.

The logistics information management server 450 can generate the auto registration key, and after one hour has elapsed, the auto registration key can be mapped to the MAC address of the home appliance 200.

For example, the logistics information management server 450 can generate the auto registration key mapped to the MAC address of the home appliance 200.

The logistics information management server 450 can transmit the generated auto registration key and delivery information to the mobile terminal 100 (S515).

The mobile terminal 100 can search for the home appliance 200 based on the delivery information (S517).

The mobile terminal 100 can search for the home appliance 200 by using the MAC address included in the delivery information.

The mobile terminal 100 can activate SoftAP to confirm whether a device having the MAC address is found.

The mobile terminal 100 can transmit an interworking request to the found home appliance 200 through the auto registration key (S519).

The mobile terminal 100 can transmit the auto registration key to the home appliance 200.

The mobile terminal 100 can encrypt the auto registration key and transmit the encrypted auto registration key to the home appliance 200.

The mobile terminal 100 and the home appliance 200 can exchange information with each other in response to the interworking request (S521) and complete the interworking based on the exchanged information (S523).

After the interworking with the home appliance 200 is completed, the mobile terminal 100 can transmit, to the home appliance management server 460, a product registration request requesting registration of the home appliance 200 (525).

The product registration request can include the user information, the MAC address, and the auto registration key.

The home appliance management server 460 can perform a procedure for registering the home appliance 200 in response to the product registration request and can transmit a product registration response indicating the registration result to the mobile terminal 100 (S527).

Similarly, after the interworking with the home appliance 200 is completed, the home appliance 200 can transmit, to the home appliance management server 460, a product registration request requesting registration of the home appliance 200 (529).

The home appliance management server 460 can register the home appliance 200 in response to the product registration request, and transmit, to the home appliance 200, the product registration response indicating the registration result (S531).

In some implementations, the home appliance management server 460 can compare the auto registration key received from the home appliance 200 with the auto registration key received from the mobile terminal 100.

The home appliance management server 460 can receive the MAC address and the auto registration key from the home appliance 200, and can receive the MAC address and the auto registration key of the home appliance 200 from the mobile terminal 100.

The home appliance management server 460 can determine whether the MAC addresses correspond to each other. When the MAC addresses correspond to each other, the home appliance management server 460 can determine whether the auto registration keys are identical to each other.

When the auto registration keys are identical to each other, the home appliance management server 460 can complete the product registration of the home appliance 200.

Operations S525 and S527 may occur simultaneously with operations S529 and S531, or their precedence may be changed.

Figure 7A:
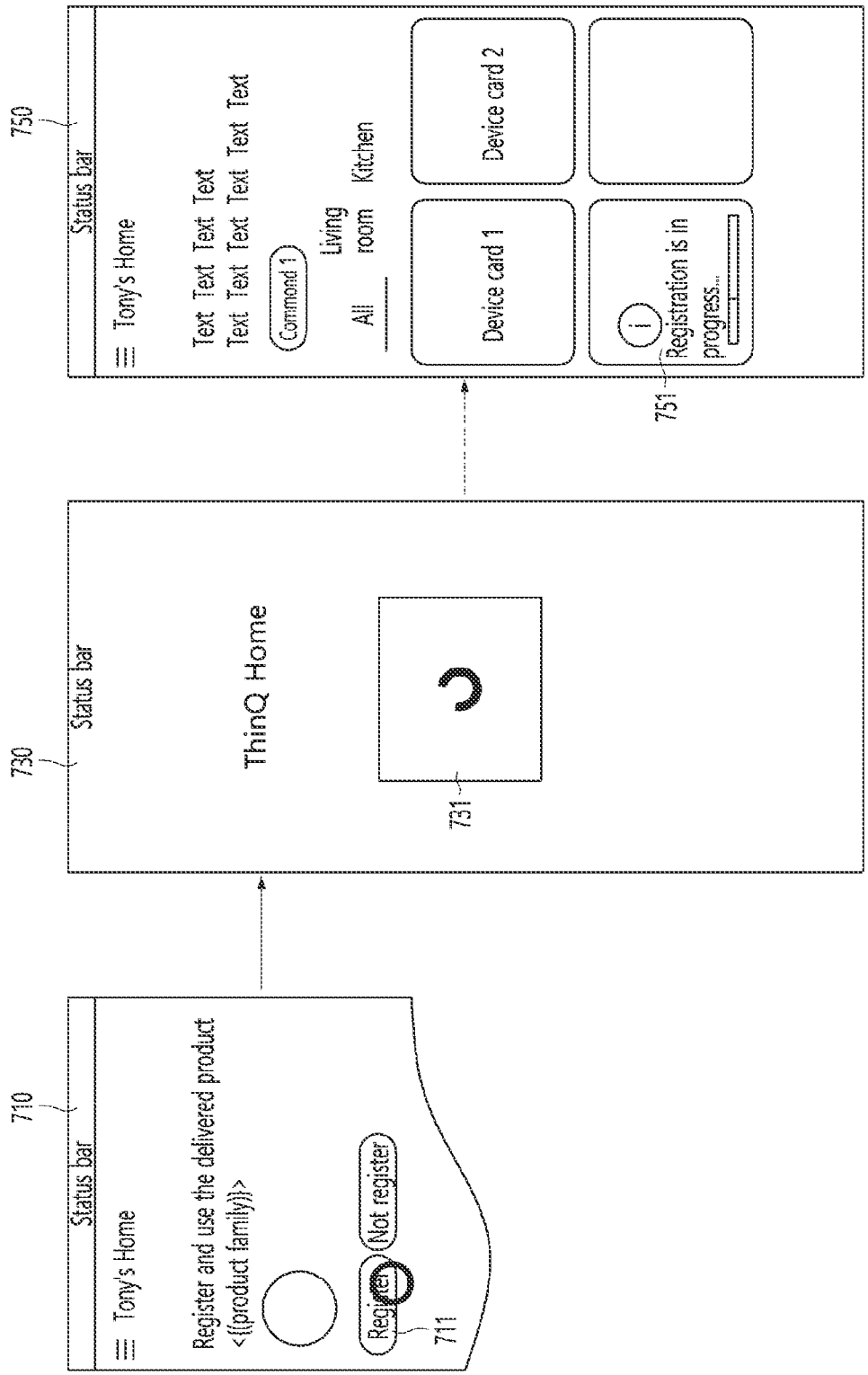
FIGS. 7A and 7B are diagrams illustrating an example of automatic registration of a home appliance on a mobile terminal of a user.
Figure 7B:
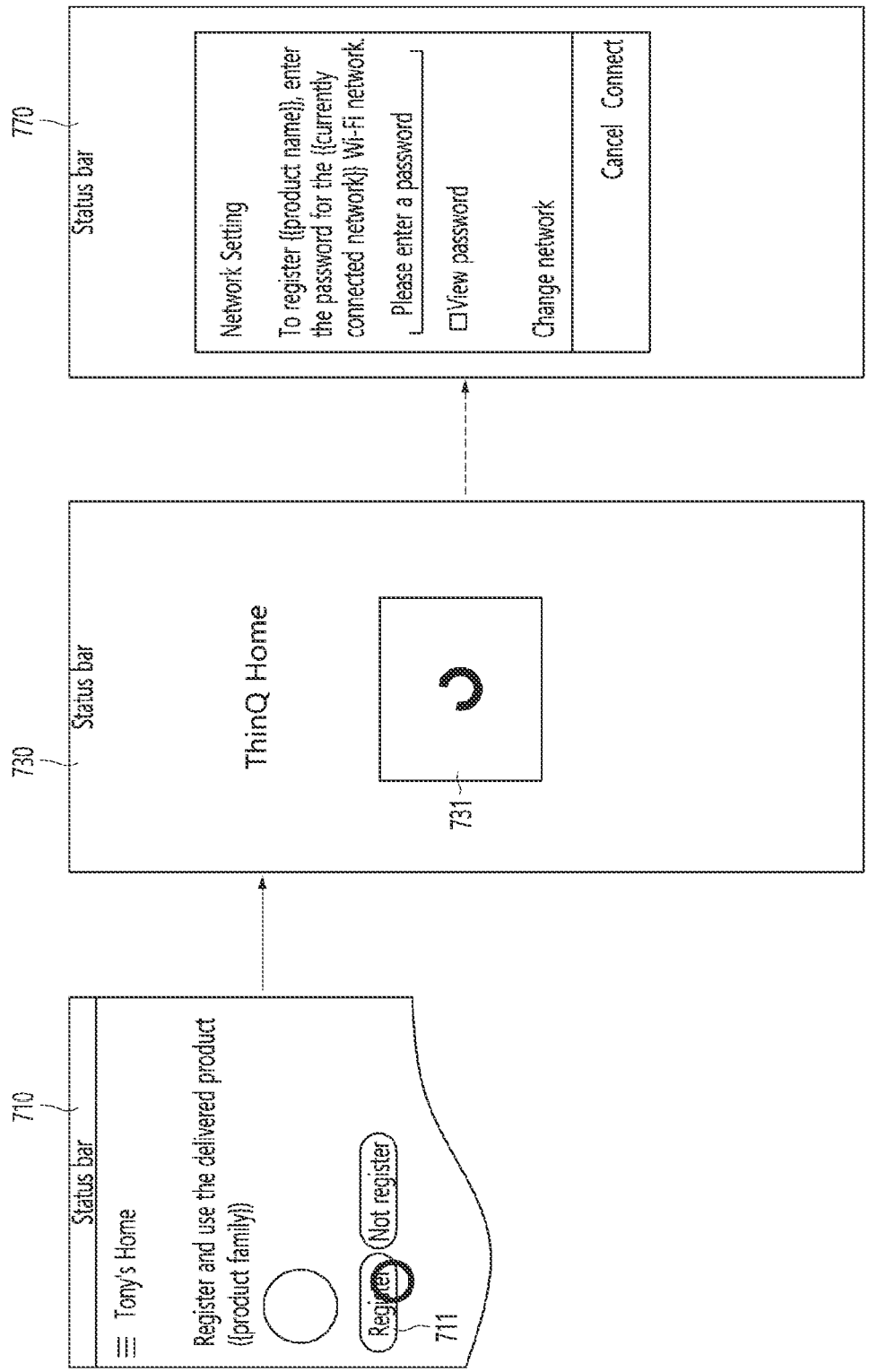

FIGS. 7A and 7B are diagrams illustrating an example of automatic registration of a home appliance on a mobile terminal of a user.

First, referring to FIG. 7A, a mobile terminal 100 can display an automatic registration guide screen 710 on a display.

The mobile terminal 100 can display the automatic registration guide screen 710 by executing a home appliance management app upon reception of the push notification described in FIG. 5.

The automatic registration guide screen 710 can include text that guides a user to automatically register the delivered home appliance, and an icon representing the home appliance.

When a register button 711 included on the automatic registration guide screen 710 is selected, the mobile terminal 100 can display a home appliance search screen 730.

The selection of the register button 711 can be a button for triggering operation S507 described in FIG. 5. Operations after operation S505 can be performed on the product registration system 4 according to selection of the register button 711.

The selection of the register button 711 can be an automatic registration request for automatic registration of the home appliance.

The network scan screen 730 can include a screen indicating that a Wi-Fi network is being searched for.

When the Wi-Fi network is automatically connected, the mobile terminal 100 can display an automatic registration process screen 750 indicating that the home appliance is being automatically registered. The automatic registration process screen 750 can include a device card 751 indicating that the home appliance is being automatically registered to the home appliance management server 460.

In some implementations, the automatic registration process can be performed in the background such that the mobile terminal 100 can perform other tasks while the automatic registration process is performing. Accordingly, the user does not need a separate input for registration of the home appliance, thereby significantly improving convenience.

As the automatic registration process progresses in the background, it is possible to provide a new user experience that enables other tasks to be performed through the mobile terminal 100.

In some implementations, when it is necessary to input a password for the Wi-Fi network, the mobile terminal 100 can display a network information input screen 770 indicating that a network password is required for product registration.

The network information input screen 770 can include a screen displayed when the mobile terminal 100 performs an initial connection with an access point (AP) provided in the house.

Through the automatic connection, when it is unnecessary to input the password of the Wi-Fi network, the mobile terminal 100 can display the automatic registration process screen 750 after displaying the network scan screen 730, as illustrated in FIG. 7A.

When it is necessary to input the password of the Wi-Fi network, the mobile terminal 100 can display the network information input screen 770 after displaying the network scan screen 730, as illustrated in FIG. 7B.

As described above, in some implementations, since it is unnecessary to provide a user with a different physical key usage method and a different guide document for each product, a user does not need learn another process for product registration.

In addition, since it is unnecessary to force input of a physical key within a limited time (for example, three minutes) during product registration, convenience can be provided to a user.

In addition, since product registration is automatically performed in the background, it is possible to provide a convenience in which there is almost no UI presentations that is provided to a user. For example, the automatic registration can be performed in the mobile terminal 100 in the background such that displaying any presentations on the mobile terminal 100 may not be necessary.

In addition, when the delivered product is retrieved from the user terminal through the delivery information notification (push notification), the user permits the product registration, so that the product registration can be automatically performed. For example, it is unnecessary to provide another guide UX for product registration (however, the UI may be provided when the initial in-house AP information input is required, e.g., see FIG. 7B).

Moreover, a UX of a new experience that enables other Internet services (Store, product monitoring, etc.) to be used without interruption during product registration may be provided to a user.

Figure 8:
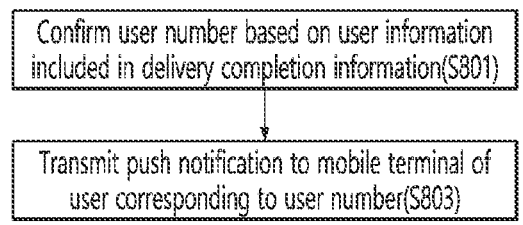
FIG. 8 is a diagram illustrating an example of transmitting a push notification.

FIG. 8 is a diagram illustrating an example of transmitting a push notification.

For example, FIG. 8 is a detailed diagram of operation S503 of FIG. 5.

Referring to FIG. 8, the logistics information management server 450 can confirm a user number based on user information included in delivery completion information (S801).

The user information included in the delivery completion information can include user account information. The user account information can include a user ID for accessing the home appliance management app.

The logistics information management server 450 can store a user number corresponding to the user ID. The user number can be a unique number for identifying the user.

The logistics information management server 450 can transmit the push notification to the mobile terminal 100 of the user corresponding to the confirmed user number (S803).

The logistics information management server 450 may extract a user ID corresponding to the confirmed user number and transmit the push notification to the mobile terminal 100 corresponding to the extracted user ID.

Figure 9:
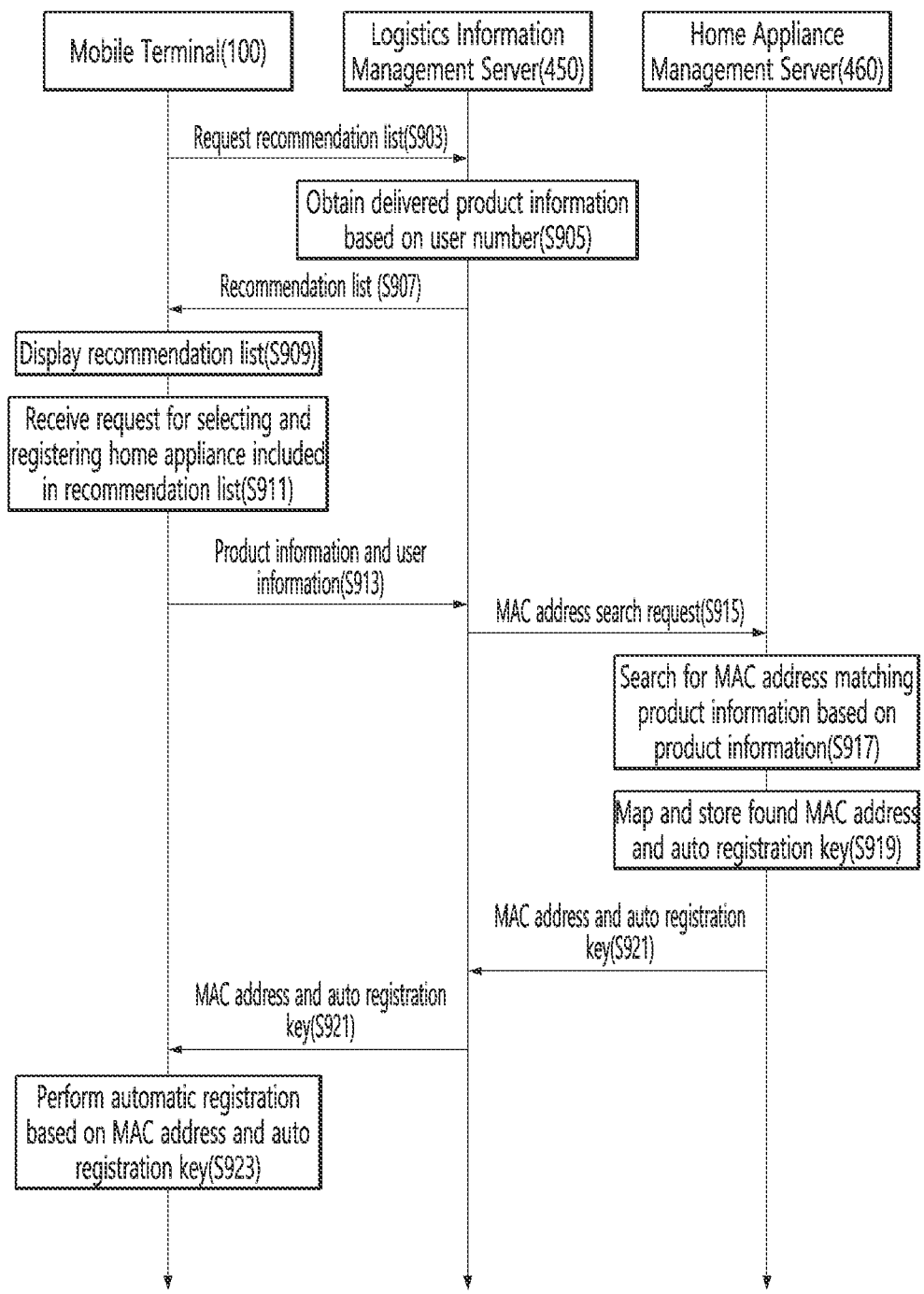
FIG. 9 is a diagram illustrating an example of a product registration system for describing operations of FIG. 5.

FIG. 9 is a diagram illustrating an example of the product registration system for describing operations of FIG. 5.

Referring to FIG. 9, the mobile terminal 100 can transmit, information server 450, a to the logistics management recommendation list request for confirming whether there is a home appliance to be registered (S903).

The recommendation list request can include a user number identifying a user, and an EMP token corresponding to the user number. The EMP token can include a token issued to identify a user account for user security. The EMP token can be updated at regular intervals.

Based on the user number included in the received recommendation list request (903), the logistics information management server 450 can obtain product information about a product that has been delivered (S905).

The product information can be mapped to the user number, and can include a serial number or a logistics barcode of the home appliance 200 that has been delivered.

The logistics information management server 450 can transmit the recommendation list to the mobile terminal 100 based on the product information (S907).

The logistics information management server 450 can transmit the recommendation list to the mobile terminal 100 only when the received user number is mapped to the EMP token.

The logistics information management server 450 can transmit, to the mobile terminal 100, the recommendation list including information about the home appliance that have been delivered, based on the serial number or the logistics barcode included in the product information.

The information about the home appliance can include one or more of a type of the home appliance and a model name of the home appliance.

The mobile terminal 100 can display the recommendation list (S909), and can receive a request for selecting and registering a specific home appliance among one or more home appliances included in the recommendation list (S911).

The mobile terminal 100 can transmit product information and user information of the selected home appliance 200 to the logistics information management server 450 in response to the received request (S913).

The user information can include a user number and an EMP token.

When the user number and the EMP token are mapped, the logistics information management server 450 can transmit, to the home appliance management server 460, a MAC address search request for searching for the MAC address of the home appliance 200 (S915).

The MAC address search request can include the product information.

The home appliance management server 460 can search for the MAC address corresponding to the product information based on the product information (S917).

The home appliance management server 460 can store, in a database, a plurality of MAC addresses mapped to a plurality of serial numbers or a plurality of logistics barcodes.

The home appliance management server 460 can search for and extract the MAC address corresponding to the serial number or the logistics barcode.

When the MAC address is found, the home appliance management server 460 can generate an auto registration key mapped to the MAC address, and can map and store the MAC address and the auto registration key (S919).

The auto registration key can include a key generated for automatic registration of the home appliance 200. The auto registration key can be a key valid only for a certain time, and cannot be used as a valid key after a certain time has elapsed.

The home appliance management server 460 can transmit the MAC address and the auto registration key mapped thereto to the logistics information management server 450 (S921).

The logistics information management server 450 can transmit the MAC address and the auto registration key mapped thereto to the mobile terminal 100 (923).

The mobile terminal 100 can perform automatic registration of the home appliance 200 based on the received MAC address and auto registration key (S923).

The mobile terminal 100 can search for the home appliance 200 having the same MAC address based on the received MAC address, and can automatically register the found home appliance 200.

Figure 10:
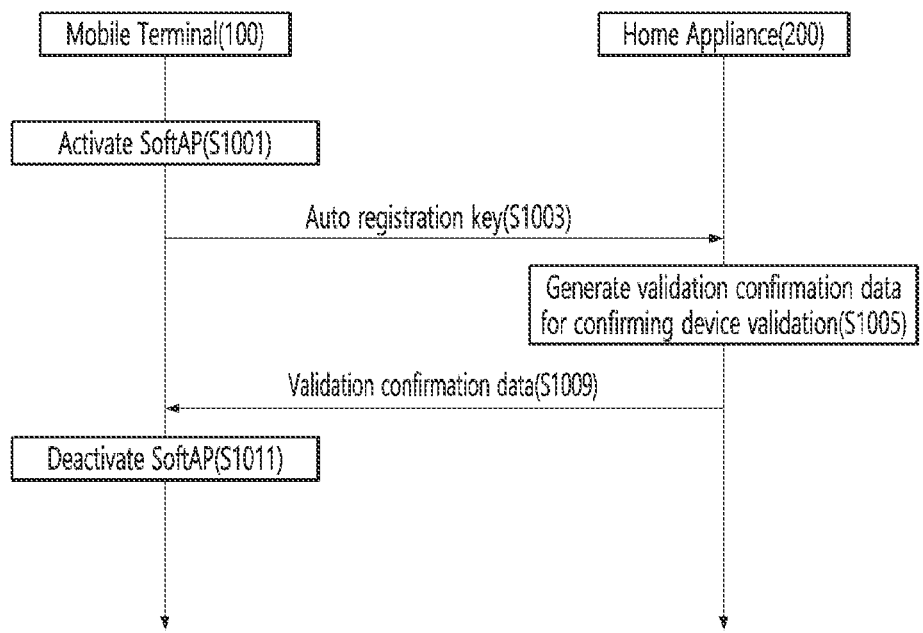
FIGS. 10 and 11 are diagrams illustrating an example of automatic product registration of a home appliance.
Figure 11:
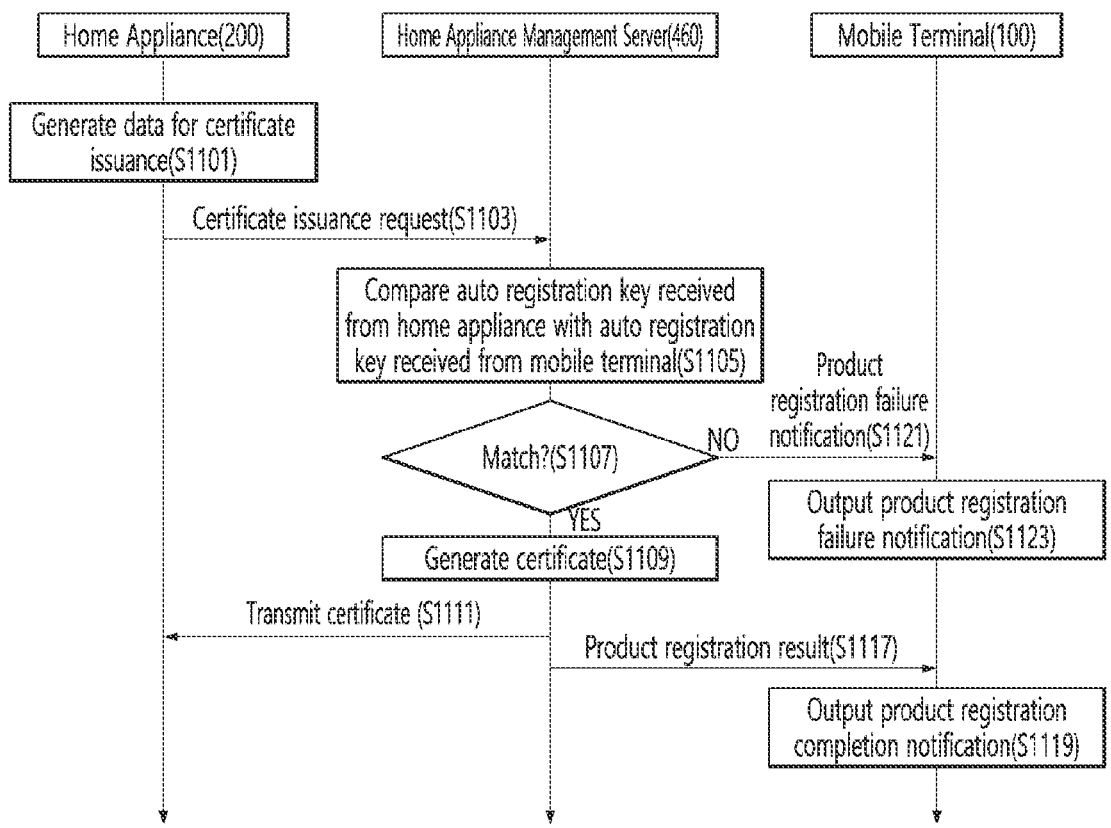

FIGS. 10 and 11 are diagrams illustrating an example of automatic product registration of a home appliance.

For example, FIGS. 10 and 11 are diagrams for describing operations of FIG. 5.

Referring to FIG. 10, the mobile terminal 100 can activate SoftAP (S1001) and transmit an auto registration key to the home appliance 200 matching a MAC address (S1003).

The mobile terminal 100 can also transmit information necessary for interworking, such as AP connection information and service code, in addition to the auto registration key.

The home appliance 200 can generate validation confirmation data for device validation, based on the received auto registration key (S1005).

In a conventional registration method, when the home appliance 200 does not receive the auto registration key, it is necessary to perform a registration process through a physical key input rather than performing automatic registration.

The home appliance 200 can transmit the generated validation confirmation data to the mobile terminal 100 (S1009).

The mobile terminal 100 can deactivate the SoftAP upon reception of the validation confirmation data (S1011).

Referring to FIG. 11, after receiving the auto registration key, the home appliance 200 can generate certificate issuance data for certificate issuance (S1101).

The data for certificate issuance can be data generated in order to receive a certificate indicating that the home appliance 200 has been registered to the home appliance management server 460.

The data for certificate issuance can be encrypted through a server public key received from the home appliance management server 460.

The data for certificate issuance can include the auto registration key of the home appliance 200.

The home appliance 200 can transmit, to the home appliance management server 460, a certificate issuance request including the data for certificate issuance (S1103).

The certificate issuance request can be included in the product registration request of operation S529 of FIG. 5.

The home appliance management server 460 can receive the certificate issuance request received from the home appliance 200, and compare the auto registration key included in the certificate issuance request with the auto registration key received from the mobile terminal 100 (S1105).

The home appliance management server 460 can decrypt the certificate issuance data included in the certificate issuance request, and can extract the auto registration key from the decrypted data.

In some implementations, the mobile terminal 100 can transmit the product registration request transmitted to the home appliance management server 460 in operation S525 by including the auto registration key received from the logistics information management server 450 therein.

The home appliance management server 460 can compare the auto registration key received from the mobile terminal 100 with the auto registration key received from the home appliance 200.

The home appliance management server 460 can determine whether the two auto registration keys correspond to each other (S1107). When the two auto registration keys correspond to each other, the home appliance management server 460 can generate a certificate authenticating that the home appliance 200 is owned by the user (S1109).

The home appliance management server 460 can store the generated certificate.

The certificate can include a MAC address of the home appliance 200, a user number (or a user account) corresponding to the owner of the home appliance 200, and information indicating that product registration has been completed.

The home appliance management server 460 can transmit the generated certificate to the home appliance 200 (S1111). Operation S1111 may correspond to operation 531 of FIG. 5.

In some implementations, the home appliance management server 460 can transmit, to the mobile terminal 100, a product registration result indicating that the home appliance 200 has been registered to the home appliance management server 460 (S1117).

Operation S1117 may correspond to operation S527 of FIG. 5.

The mobile terminal 100 can output a notification indicating that the product registration has been completed, based on the received product registration result (S1119).

When the two auto registration keys do not correspond to each other, the home appliance management server 460 can transmit, to the mobile terminal a product registration failure 100, notification indicating that the registration of the home appliance 200 has failed (S1121).

The mobile terminal 100 can output the received product registration failure notification (S1123).

Operation S1117 or S1121 may correspond to operation S527 of FIG. 5.

Figure 12:
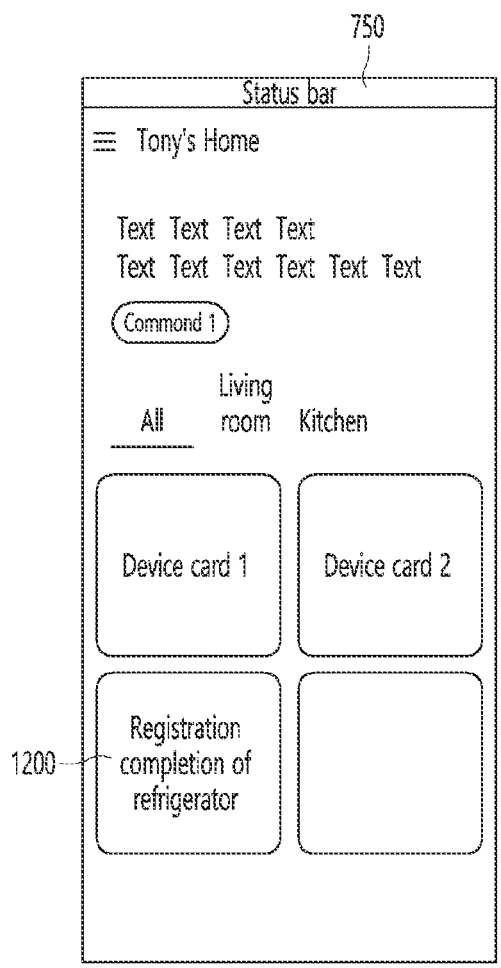
FIG. 12 is a diagram illustrating an example of a screen indicating that automatic registration of a home appliance is completed.

FIG. 12 is a diagram illustrating an example of a screen indicating that automatic registration of a home appliance is completed.

Referring to FIG. 12, when automatic registration of a refrigerator is completed, a notification 1200 indicating that the product registration of the refrigerator has been completed can be displayed on a device card corresponding to the refrigerator in an automatic registration process screen 750.

Figure 13:
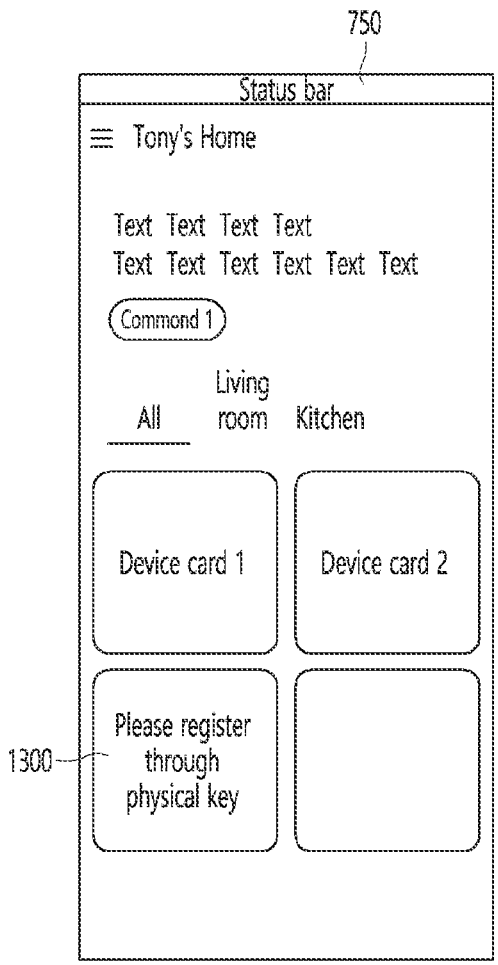
FIG. 13 is a diagram illustrating an example of a screen displayed when automatic registration of a home appliance fails.

FIG. 13 is a diagram illustrating an example of a screen displayed when automatic registration of a home appliance fails.

Referring to FIG. 13, when the automatic registration of the refrigerator fails, a notification 1300 requesting product registration through a physical key (or a confirm key) can be displayed on the device card corresponding to the refrigerator in the automatic registration process screen 750.

In some implementations, the user performs the product registration procedure through the conventional physical key input.

In some implementations, by operating the mass production server 470 of the manufacturer, the logistics server 430 of the manufacturer, and the home appliance management app while interworking with each other, the product purchased by the customer and the product delivered to the customer can be confirmed in the manufacturer system, thereby securing reliability.

Therefore, 1:1 mapping between the serial number or logistics barcode of the delivered product and the Wi-Fi MAC address of the product may be possible.

In addition, since the Wi-Fi MAC Address of the product delivered to the customer can be received from the server based on the reliable data, it is possible to confirm that the product is the customer's own product by comparing the MAC Address of the product found through the home appliance management app installed on the mobile terminal 100 with the MAC Address received from the server.

After the request for the issuance of the auto registration key, product automatic registration can be possible with a timeout of one hour, and mutual authentication with the mobile terminal 100, the home appliance 200, and the home appliance management server 460 is possible with this value.

A security policy at a level similar to the confirmation process using a physical key (whether the product is owned by the user through physical input) is used by requesting the certificate issuance in the product by using the auto registration key issued by the logistics server 430 and the interlocking with the logistics information management server 450. Therefore, the confirmation process using the physical key may be omitted.

The above-described method can be implemented with codes readable by a processor on a medium in which a program is recorded. Examples of the processor-readable medium may include ROM, RAM, CD-ROM, magnetic tape, floppy disk, and optical data storage device.

The display device described above is not limitedly applicable to the configuration and method of the above-described implementations, and the implementations are configured by selectively combining all or part of each of the embodiments such that various modifications can be made.

The invention claimed is:

1. A mobile terminal comprising:
a display;
a wireless communication interface configured to perform wireless communication with a home appliance or an external server; and
a controller configured to:
control the display to display an automatic registration guide screen displaying one or more home appliances according to execution of a home appliance management application,
receive an automatic registration request for automatic registration of a first home appliance among the one or more home appliances, and
control the display to display an automatic registration process screen indicating automatic registration progress of the first home appliance in response to the received automatic registration request,
wherein the controller is configured to:
receive, from a first server, an auto registration key corresponding to a media access control (MAC) address of the first home appliance according to the reception of the automatic registration request, and
transmit the received auto registration key to a second server and the first home appliance.

2. The mobile terminal of claim 1, wherein the controller is configured to control the display to display a notification received from the second server and indicating that the automatic registration of the home appliance has been completed.

3. The mobile terminal of claim 2, wherein the notification indicating that the automatic registration of the first home appliance has been completed is provided by the second server after determining that an auto registration key received from the first home appliance corresponds to the auto registration key from the mobile terminal.

4. The mobile terminal of claim 1, wherein the controller is configured to, based on the automatic registration of the first home appliance being failed, control the display to display a notification received from the second server and requesting registration of the first home appliance through a physical key of the first home appliance.

5. The mobile terminal of claim 4, wherein the notification requesting registration of the first home appliance through the physical key is provided by the second server after determining that an auto registration key received from the first home appliance does not correspond to the auto registration key from the mobile terminal.

6. The mobile terminal of claim 1, wherein the controller is configured to, based on a predefined time being elapsed, invalidate the auto registration key.

7. The mobile terminal of claim 1, wherein the controller is configured to perform the automatic registration of the first home appliance in a background of the mobile terminal such that performing the automatic registration does not cause the display to display an object related to the automatic registration.

8. The mobile terminal of claim 1, wherein the controller is configured to:

receive, from the first server, a push notification indicating that delivery of the first home appliance has been completed, and execute the home appliance management application according to the received push notification.

9. The mobile terminal of claim 8, wherein the push notification corresponds to a user number that is confirmed by the first server based on user information included in delivery completion information.

10. An automatic registration method of a mobile terminal, the automatic registration method comprising:

displaying an automatic registration guide screen displaying one or more home appliances according to execution of a home appliance management application;

receiving an automatic registration request for automatic registration of a first home appliance among the one or more home appliances;

displaying, in response to the received automatic registration request, an automatic registration process screen indicating automatic registration progress of the first home appliance;

receiving, from a first server, an auto registration key corresponding to a media access control (MAC) address of the first home appliance in response to reception of the automatic registration request; and transmitting the received auto registration key to a second server and the first home appliance.

11. The automatic registration method of claim 10, further comprising displaying a notification received from the second server and indicating that the automatic registration of the first home appliance has been completed.

12. The automatic registration method of claim 11, wherein the notification indicating that the automatic registration of the first home appliance has been completed is provided by the second server after determining that an auto registration key received from the first home appliance corresponds to the auto registration key from the mobile terminal.

13. The automatic registration method of claim 10, further comprising displaying, based on the automatic registration of the first home appliance being failed, a notification received from the second server and requesting registration of the first home appliance through a physical key of the first home appliance.

14. The automatic registration method of claim 13, wherein the notification requesting registration of the first home appliance through the physical key is provided by the second server after determining that an auto registration key received from the first home appliance does not correspond to the auto registration key from the mobile terminal.

15. The automatic registration method of claim 10, wherein the auto registration key is invalidated based on a predefined time being elapsed.

16. The automatic registration method of claim 10, wherein the automatic registration of the first home appliance is performed in a background of the mobile terminal such that performing the automatic registration does not display an object related to the automatic registration.

17. The automatic registration method of claim 10, further comprising:

receiving, from the first server, a push notification indicating that delivery of the first home appliance has been completed; and executing the home appliance management application according to the received push notification.

18. The automatic registration method of claim 17, wherein the push notification corresponds to a user number that is confirmed by the first server based on user information included in delivery completion information.

* * * * *